United States Patent Office 3,102,114
Patented Aug. 27, 1963

3,102,114
POLYOXYETHYLENE DERIVATIVES OF ESTERS OF SUCROSE WITH LONG-CHAIN FATTY ACIDS
Saburo Komori, 56 Aza-Ogaito, Hirakata, and Mitsuo Okahara, 753-62 Hata, Neyagawa, both of Osaka, Japan
No Drawing. Filed Apr. 3, 1961, Ser. No. 100,001
15 Claims. (Cl. 260—234)

This invention relates to new solubilizing and emulsifying agents useful for foods, medicines, and cosmetics, and more concretely to polyoxyalkylene derivatives of esters of sucrose with long-chain fatty acids, and a method for synthesizing them.

A number of publications concerning the long-chain fatty acid monoesters of sucrose have appeared since the synthesis of the sucrose monoesters was first reported in 1956 by Osipow et al. (L. Osipow et al.; Ind. Eng. Chem.; vol. 48, 1459–1464) and the method for preparing the compounds, their properties and the uses thereof have been investigated in detail.

Sucrose monoesters are said to be inexpensive as compared with other non-ionic surfactants and have many desirable properties as solubilizing or emulsifying agents for food, medicine and cosmetics. However, in the manufacture of sucrose monoesters, sucrose diesters are inevitable by-products responsible for a lowered surface-activity because of the poor solubility of the diesters in water. For certain purposes, the sucrose monoesters can be separated and purified by recrystallizing the mixture from acetone or ethanol, but this method is difficult and costly because the sucrose monoesters containing sucrose diesters as by-products are solids or extremely viscous liquids, and from an industrial standpoint, it is more desirable to use the mixture of mono- and diesters without further refining.

Although sucrose diesters can be simply prepared by alcoholysis by using a 2:1 molar ratio of the ester to sucrose (K. Mihara et al., J. Chem. Soc. Japan, Ind. Chem. Sect., vol. 62, 393–395 [1959]), sucrose diesters of acids of chain length greater than myristic acid ($C_{14}$) are practically insoluble in water, and their use as emulsifying agents is limited to the formation of water-in-oil emulsions.

A primary object of the present invention is to increase the solubility in water of the sucrose esters, especially diesters, with fatty acids by reaction with an alkylene oxide such as ethylene oxide or propylene oxide in order to make use of the cheaply producible and surplus sucrose diesters.

The present invention successfully overcomes the difficulty by synthesizing the objective polyoxyalkylene derivatives of sucrose mono- and/or diesters with long-chain fatty acids, the said new derivatives being soluble in water and having excellent properties as solubilizing and emulsifying agents, and also being superior with respect to activity as surfactants and with respect to toxicity to the polyoxyethylene sorbitan mono esters known as Tween 20, Tween 80, etc., as well as to the sucrose mono- and diesters per se.

For the synthesis of the new compounds, a lower alkyl ester of a fatty acid having eight to twenty-two carbon atoms, such as propyl, butyl, pentyl, octyl but preferably methyl or ethyl caprinate, myristate, palmitate, stearate, oleate erucate, etc. is first converted into the corresponding sucrose ester by alcoholysis with sucrose at a temperature of about 80–120° C., more particularly 90–105° C., under a reduced pressure of 1 to 250 mm. Hg. As solvent, use is preferably made of dimethylformamide, dimethylacetamide, an acylmorpholine such as e.g. formylmorpholine, an acylpyrrolidine such as e.g. formylpyrrolidine, an alkylpyrrolidone such as e.g. N-methylpyrrolidone, dimethylsulfoxide, etc. The reaction usually ceases in a comparatively short period, such as 5 to 240 minutes.

The results of several runs of this alcoholysis are shown in Table I, Table II and Table III. In the runs of Tables I and II, methyl caprinate is used as the fatty acid ester, formylmorpholine as the solvent, and potassium carbonate as the catalyst. The molar ratio of methyl caprinate:sucrose:potassium carbonate is 2:1:0.2.

Table I shows the relations between reaction conditions and reaction velocity during the reaction, and Table II shows yields and saponification values (abbreviated as S.V.) of the products obtained at each of 60, 120, 180 and 240 minutes after the start of the reaction.

TABLE I

| Run No. | Reaction temperature (°C.) | Reaction pressure (mm.Hg) | Reaction time (minutes) and reaction rate [1] (percent) | | | |
|---|---|---|---|---|---|---|
| | | | 60 (min.) | 120 (min.) | 180 (min.) | 240 (min.) |
| 1 | 80 | 10 | 34.0 | 48.0 | 58.0 | 65.5 |
| 2 | 90 | 20 | 35.5 | 55.5 | 65.0 | 73.0 |
| 3 | 95 | 30 | 37.5 | 58.5 | 72.0 | 85.5 |
| 4 | 100 | 30 | 37.0 | 60.5 | 76.0 | 91.0 |

[1] Reaction rate is expressed as percentage of quantity of methyl caprinate consumed by the time relative to quantity at the start.

TABLE II

| Run No. | Reaction time (minutes), Yield (percent) and S.V. | | | | | | | |
|---|---|---|---|---|---|---|---|---|
| | 60 | | 120 | | 180 | | 240 | |
| | Yield | S.V. | Yield | S.V. | Yield | S.V. | Yield | S.V. |
| 1 | 31.2 | 168.5 | 43.2 | 164.3 | 55.0 | 162.8 | 60.8 | 168.5 |
| 2 | 31.3 | 170.3 | 51.5 | 169.1 | 63.0 | 172.5 | 70.0 | 167.3 |
| 3 | 31.5 | 166.5 | 55.2 | 173.3 | 70.0 | 169.3 | 82.0 | 175.0 |
| 4 | 32.0 | 169.2 | 57.0 | 169.8 | 73.0 | 170.5 | 85.5 | 166.8 |

Theoretical S.V. of sucrose monocaprinate: 112.9.
Theoretical S.V. of sucrose dicaprinate: 172.4.

When the molar ratio of methyl ester relative to sucrose is lower than 2, the reaction ceases in a rather shorter period such as 5 to 180 minutes than in the case of the molar ratio 2, and the product is usually in a state of mixture of sucrose mono- and diesters. Results where equimolar amounts of methyl palmitate and sucrose are used, are shown in Table III in terms of the relations of the yield and the saponification value of the product obtained in each reaction time.

TABLE III

| Run No. | Reaction temperature (°C.) | Reaction Pressure (mm Hg) | Reaction time (min.), Yield (percent) and S.V. | | | | | | | |
|---|---|---|---|---|---|---|---|---|---|---|
| | | | 60 | | 120 | | 180 | | 240 | |
| | | | Yield | S.V. | Yield | S.V. | Yield | S.V. | Yield | S.V. |
| 1 | 80 | 10 | 48.2 | 116.8 | 63.5 | 121.1 | 77.0 | 119.4 | 91.5 | 120.4 |
| 2 | 90 | 20 | 51.5 | 118.2 | 68.2 | 120.5 | 80.0 | 121.0 | 93.2 | 117.7 |
| 3 | 100 | 30 | 55.6 | 119.5 | 71.0 | 123.1 | 83.5 | 118.8 | 95.9 | 120.6 |

Theoretical S.V. of sucrose monopalmitate: 96.4.
Theoretical S.V. of sucrose dipalmitate: 137.0.

The product thus obtained is, strictly speaking, usually a mixture of sucrose monoester and sucrose diester, though it is much easier to product an excess of the latter than the reverse. However, the mixture can itself be used as the intermediate for the synthesis of useful emulsifying and solubilizing agents, because both polyoxyalkylene derivatives of sucrose mono- and diesters have quite good properties as emulsifying and solubilizing agents.

However, the sucrose mono- and diesters may be separated from each other. The sucrose monoester is not only useful in itself as a surfactant but also as the intermediate for the synthesis of polyoxyalkylene derivatives which have more desirable properties than sucrose monoester itself. The sucrose diester is not as good a surfactant as the monoester, but its polyoxyalkylene derivatives have good properties as a surfactant. Hence, the sucrose diester may be separated from the sucrose monoester after the alcoholysis reaction and before being subjected to the addition reaction which is effected after the manner hereinafter described.

For the purification and separation of each of sucrose monoester and diester, the reaction mixture is neutralized and filtered at the end of the reaction. The solvent is removed by distillation under reduced pressure. Extraction with n-hexane has no advantage at this point because the sucrose diester would be extracted along with unreacted alkyl ester of fatty acid. Accordingly, the reaction product from, for example, methyl palmitate contains sucrose, methyl palmitate, and the catalyst. The solid residue is crushed and treated with twenty times its volume of hot acetone and the insoluble material is separated by hot filtration. Extraction of the acetone-insoluble material with butanol gives a mixture of products (sucrose and sucrose monoester). The acetone solution is concentrated to one-half the volume, cooled and filtered, and the acetone filtrate is evaporated to yield sucrose diesters and unreacted alkyl esters.

In the alcoholysis, a mixture of two or more fatty acids alkylates can also be used as the starting material, when a mixture of sucrose esters with two or more fatty acids is obtained. It is unnecessary to separate or to purify each component of the mixture of the sucrose esters from other components, because the surfactant is not required to be a single compound and may be a mixture of polyalkylene-adducts of sucrose esters. Hence, in the alcoholysis there can also advantageously be used a mixture of lower alkyl esters of fatty acids easily and inexpensively obtainable from natural oils and fats, such as lard, tallow, butter fat, whale oil, soybean oil, peanut oil, rice-bran oil, palm oil, corn oil, coconut oil, cottonseed oil, linseed oil, hempseed oil, olive oil, castor oil, almond oil, rapeseed oil, etc. The resulting mixture itself of sucrose esters may be reacted with an alkylene oxide.

The so-obtained intermediates, sucrose diesters, are then submitted to the next step of the synthesis, namely addition reaction of polyoxyalkylene groups to themselves. For industrial purposes, it is unnecessary to separate components of the reaction mixture obtained by the said reaction before they are submitted to the addition reaction, and the reaction mixture obtained in the said alcoholysis may be employed either without any treatment or after removing the solvent under reduced pressure.

To the solution of sucrose diesters, there is added an alkylene oxide such as ethylene oxide, propylene oxide, etc. at a low temperature of 0–15° C. The mixture is heated in an autoclave at a temperature of 80–160° C. for about 1 to 3 hours in the presence of a basic catalyst such as sodium hydroxide, potassium hydroxide, sodium methylate, also tertiary amines such as methyl-morpholine, dimethylbenzylamine and dimethyllaurylamine. When the temperature has attained the indicated reaction temperature, the pressure decreases rapidly as the reaction proceeds and additional alkylene oxide may be fed into the autoclave.

Alternatively, for effecting the addition reaction, the following procedure may be taken. The solvent is eliminated under reduced pressure from the reaction mixture obtained by the alcoholysis. The residue is dissolved in a solvent such as benzene, xylene, toluene, etc., the unreacted sucrose remaining undissolved in the solvent and precipitating whereupon the precipitate is filtered off and the filtrate is subjected to the addition reaction with an alkylene oxide under pressure in a manner similar to that set forth in the preceding paragraph. This procedure is rather convenient for the after-treatment, because the said solvent can dissolve the products, polyoxyalkylene derivatives of sucrose diesters, as well as the intermediates, sucrose diesters.

On completion of the reaction, the reaction mixture is filtered and neutralized with an acid such as acetic acid, and the solvent is removed under reduced pressure. In the absence of solvent, the product is generally a viscous liquid, and is dissolved in acetone or ethanol and neutralized, and the solvent is removed.

The products thus obtained according to the present invention, polyoxyalkylene derivatives of sucrose diesters, are generally yellow or orange oils or waxes with a slightly bitter taste, with melting points in a range of 10 to 40° C., soluble in water and in many organic solvents such as methanol, ethanol, dioxane, benzene, toluene, etc. to give a clear solution.

The average number of oxyethylene groups per mole of product—hereinafter expressed as $(O.E.)_n$, wherein $n$ is a numeral—can be conveniently calculated from the saponification values. According to the present invention, the range preferably extends from and including 5 to and including 190, i.e. $n=5$ to 190, but most advantageously $n=5$ to 150. When the $(O.E.)_n$ of the product is too small, the product is only dispersible in a state of emulsion and is not soluble clearly in water. Some of sucrose diesters such as dimyristates or dioleates become fully soluble in water by having $(O.E.)_{20-25}$ and even other sucrose diesters by having $(O.E.)_{30}$.

The hydrophile-lipophile balance—hereinafter expressed as H.L.B.—of the products listed below is calculated from the expression:

$$H.L.B. = 20(1 - S/A)$$

where S is the saponification value of the product and A the acid value of the fatty acid, and the respective values are shown in Table IV. The H.L.B. of the listed products covers at least a range from 14.2 to 18.6.

TABLE IV

*Properties of Polyoxyethylene Derivatives of Sucrose Diesters*

| Polyoxyethylene derivatives of sucrose diester | Ethylene oxide groups per mole | Saponification value | Specific rotation $[\alpha]_D^{25}$ | H.L.B. | Color and Form |
|---|---|---|---|---|---|
| Dimyristate | 60 | 35.2 | | 17.1 | light yellow liquid. |
| Do | 30 | 55.9 | | 15.5 | yellow liquid. |
| Dipalmitate | 135 | 17.4 | | 18.4 | light yellow wax. |
| Do | 100 | 21.2 | +4.58° | 18.0 | yellow wax. |
| Do | 80 | 26.5 | | 17.6 | brown wax. |
| Do | 55 | 33.7 | | 16.9 | light brown wax. |
| Do | 50 | 37.6 | | 16.5 | orange wax. |
| Do | 40 | 44.0 | | 16.0 | Do. |
| Do | 30 | 51.3 | | 15.3 | Do. |
| Do | 25 | 58.5 | | 14.7 | yellow wax. |
| Distearate | 135 | 17.3 | | 18.2 | Do. |
| Do | 80 | 25.5 | | 17.4 | Do. |
| Do | 75 | 27.2 | | 17.2 | light brown wax. |
| Do | 65 | 30.7 | +3.82° | 16.9 | orange wax. |
| Do | 35 | 47.4 | | 15.2 | Do. |
| Do | 15 | 69.2 | | 13.0 | reddish orange wax. |
| Dioleate | 105 | 20.4 | | 18.0 | orange wax. |
| Do | 85 | 23.9 | +5.87° | 17.6 | light yellow wax. |
| Do | 85 | 24.7 | | 17.5 | yellow wax. |
| Do | 75 | 26.6 | | 17.3 | yellow liquid. |
| Do | 50 | 37.0 | | 16.3 | Do. |
| Do | 30 | 50.0 | | 15.0 | orange liquid. |
| Do | 25 | 57.9 | | 14.2 | Do. |
| Dierucate | 190 | 11.9 | +2.15° | 18.6 | yellow wax. |
| Do | 130 | 16.8 | | 18.0 | Do. |
| Do | 105 | 20.0 | | 17.6 | brown wax. |
| Do | 50 | 35.0 | | 15.8 | yellow liquid. |

The respective values of the surface tension of aqueous solutions of representative products, measured by Du Noüy's tensiometer at 25° C., are shown in Table V. Aqueous solutions lowered surface tension to about the same extent as a polyoxyethylene derivative of sorbitan mono-oleate known as "Tween 80," for example to 40–50 dyne/cm. in 0.01–1.0% aqueous solution thereof.

TABLE V

*Surface Tension of Water Solution of the Polyoxyethylene Derivatives of Sucrose Diesters (Dyne/Cm.)*

| Polyoxyethylene derivatives of sucrose diester | Concentration (wt. percent) | | | |
|---|---|---|---|---|
| | 0.001 | 0.01 | 0.1 | 1.0 |
| Dimyristate (O.E.)$_{30}$ | 52.0 | 40.5 | 39.5 | 40.0 |
| Dipalmitate (O.E.)$_{30}$ | 57.5 | 42.5 | 42.1 | 41.6 |
| Distearate (O.E.)$_{35}$ | 57.4 | 49.2 | 43.9 | 42.2 |
| Dioleate (O.E.)$_{30}$ | 52.8 | 41.0 | 41.4 | 39.3 |
| Dierucate (O.E.)$_{50}$ | 61.0 | 49.2 | 46.0 | 46.3 |

The respective values of the interfacial tension of aqueous solution of some products against kerosene ($d$—0.7912), as measured by the Du Noüy's tensiometer at 25° C., are shown in Table VI.

TABLE VI

*Interfacial Tension of Water Solution of the Polyoxyethylene Derivatives of Sucrose Diesters (Dyne/Cm.)*

| Polyoxyethylene derivatives of sucrose diester | Concentration (wt. percent) | | | |
|---|---|---|---|---|
| | 0.001 | 0.01 | 0.1 | 1.0 |
| Dimyristate (O.E.)$_{30}$ | 25.3 | 17.0 | 12.2 | 11.0 |
| Dipalmitate (O.E.)$_{30}$ | 26.0 | 17.4 | 14.7 | 12.7 |
| Distearate (O.E.)$_{35}$ | 25.7 | 17.6 | 13.5 | 13.0 |
| Dioleate (O.E.)$_{30}$ | 25.0 | 19.0 | 14.0 | 13.5 |
| Dierucate (O.E.)$_{50}$ | 25.0 | 19.6 | 14.9 | 14.3 |

Thus, in the surface-active properties of aqueous solutions, the polyoxyethylene derivatives are equal to the polyoxyethylene sorbitan monooleate, known as "Tween 80."

Foaming properties of some of the products measured by the Ross-Miles' method at 25° C. and 40° C. are shown in Table VII.

TABLE VII

| Polyoxyethylene derivatives of sucrose diester | Ethylene oxide groups per mole | Foam Height in Millimeters | | | |
|---|---|---|---|---|---|
| | | 25° C. | | 40° C. | |
| | | Initial | At 30 min. | Initial | At 30 min. |
| Dimyristate | 60 | 51 | 39 | 50 | 19 |
| Do | 30 | 38 | 26 | 36 | 15 |
| Dipalmitate | 100 | 39 | 23 | 45 | 28 |
| Do | 30 | 26 | 15 | 46 | 32 |
| Distearate | 80 | 32 | 16 | 34 | 6 |
| Do | 35 | 15 | 10 | 25 | 13 |
| Dioleate | 85 | 36 | 24 | 45 | 7 |
| Do | 25 | 40 | 24 | 50 | 19 |
| Dierucate | 105 | 24 | 16 | 28 | 10 |
| Do | 50 | 27 | 22 | 33 | 20 |

The polyoxyethylene derivatives of sucrose diesters of the present invention thus have good surface-active properties and therefore can be used, for example, as emulsifying or solubilizing agents. Moreover, they are well suited for use in the food, pharmaceutical and cosmetic industries, where toxicity is an important factor, by reason of the fact that the said derivatives according to this invention have a very low toxicity. Thus, for example, the polyoxyethylene derivative of sucrose dioleate compares very favorably with that of Tween 80 and Tween 20. The following table shows the lethal dose, LD$_{50}$, of the polyoxyethylene derivative of the said dioleate administered by intravenous injection to male mice ($dd$ strain), in comparison with the Tweens.

TABLE VIII

Polyoxyethylene derivative of:      LD$_{50}$, mg./kg.
     Sucrose dioleate (E.O.)$_{ca.40}$ ---------------- 7,500
     Sorbitan monooleate (Tween 80) ---------- 5,800
     Sorbitan monolaurate (Tween 20) ---------- 3,700

The other polyoxyethylene derivatives of the present invention are likewise characterized by favorable toxicities.

The products of the present invention are much more effective than Tween 20 and Tween 80 for example with respect to capacity for solubilizing a lipophilic compound.

Activities of products of this invention to solubilize vitamin A alcohol and vitamin D$_2$ in water are shown in Table IX and Table X, in comparison to the solubilization activities of polyoxyethylene sorbitan monooleate (Tween 80) and monolaurate (Tween 20). The activities are measured with the respective transmittances of dispersed systems in water to which the indicated amount of the surfactant is added. When the transmittance is more than 94%, the system is regarded to be substantially a solution, namely, the fat-soluble vitamin is solubilized in water.

TABLE IX

*Solubilization of Vitamin A Alcohol (1,235,000 I.U./g.) by Polyoxyethylene Sucrose Esters*

[Transmittance at wave length 650 mμ]

| Weight ratio of vitamin A/solubilizer Solubilizer | 1:1 | 1:5 | 1:8 | 1:10 | 1:15 |
|---|---|---|---|---|---|
| Polyoxyethylene sucrose: | | | | | |
| monostearate (O.E.)$_{20}$ | 83.5 | 97.0 | 100 | 99.5 | (²) |
| dimyristate (O.E.)$_{60}$ | 90.0 | 98.0 | (²) | 98.0 | (²) |
| dipalmitate (O.E.)$_{135}$ | 95.0 | 98.0 | (²) | (²) | (²) |
| distearate (O.E.)$_{65}$ | (¹) | 98.0 | 98.0 | (²) | (²) |
| dioleate (O.E.)$_{50}$ | (¹) | 94.0 | (²) | 98.0 | (²) |
| Tween 20 | (¹) | 0 | (¹) | 95.0 | (²) |
| Tween 80 | (¹) | 0 | (¹) | 96.0 | (²) |

¹ Not measured.
² Solubilized.

TABLE X

*Solubilization of Vitamin $D_2$ (Crystal) by Polyoxyethylene Sucrose Esters*

[Transmittance at wave length 650 mµ]

| Weight ratio of vitamin $D_2$/solubilizer. Solubilizer | 1:5 | 1:8 | 1:10 | 1:15 | 1:20 |
|---|---|---|---|---|---|
| Polyoxyethylene sucrose: | | | | | |
| monostearate (O.E.)$_{30}$ | 82.0 | 100 | 99.0 | (2) | (2) |
| dimyristate (O.E.)$_{80}$ | (1) | (1) | 98.0 | (2) | (2) |
| dipalmitate (O.E.)$_{135}$ | 85.0 | (1) | 95.0 | (2) | (2) |
| distearate (O.E.)$_{65}$ | 70.0 | (1) | 98.0 | (2) | (2) |
| dioleate (O.E.)$_{50}$ | (1) | (1) | 91.0 | 98.0 | (2) |
| dierucate (O.E.)$_{50}$ | (1) | (1) | 82.0 | 94.0 | 98.0 |
| Tween 20 | 53.0 | (1) | 95.0 | (2) | (2) |
| Tween 80 | 45.0 | (1) | (1) | 98.0 | (2) |

[1] Not measured.
[2] Solubilized.

Because of the strong surface-active and non-toxic properties of the polyoxyalkylene-adducts of sucrose with long-chain fatty acids, they have many applications in the field of surface-active agents. For example, the adducts are useful for various emulsifying and solubilizing purposes. By utilizing the adducts, cosmetics such as lotion, hair lotion, vanishing cream, cleansing cream, cold cream, toothpaste, etc., foods such as dairy products, salad dressing, mayonnaise, butter, margarine, chocolate, ice-cream, etc., ointment bases or water-soluble preparations of lipophilic pharmaceuticals such as vitamin A, vitamin D, vitamin E, etc., emulsions of agricultural drugs and so on are satisfactorily prepared. They are also useful as non-ionic detergents for hair shampoo, cleansing cream, toilet use, etc. without any harm to hair and skin. They may further be employed to wash and clean vegetables, where they are advantageous in that the taste of the vegetables is not affected and that there is no harm to the human body, even if the detergent is not completely washed off. The adducts can be used in the metal and fiber industries as excellent detergents, e.g. for cleaning the surface of metal prior to plating or removing fats from textile fibers. Further, the adducts can be used as an addition to baits for cattle or poultry.

The invention is described in further particularity by means of the following examples. It will be understood that the invention is not limited to the particular details of these examples, which are illustrative. In these examples, the relationship between part by weight and part by volume is the same as that between gram and milliliter. The temperatures are all uncorrected.

EXAMPLE 1

A reaction tube is charged with 10.3 parts by weight of sucrose and 8.1 parts by weight of methyl palmitate, and then 50 parts by weight of formylmorpholine and 0.3 part by weight of potassium carbonate are added, and the mixture then subjected to trans-esterification reaction for 2 hours at 100° C. under the pressure of 30 mm. Hg. The reaction mixture is extracted three times, each time with 50 parts by volume, of n-hexane. Into the mixture thus-treated, 30 parts by weight of ethylene oxide are dissolved. The mixture is then transferred to an autoclave and 0.1 part by weight of sodium hydroxide added thereto. The mixture is heated to 115° C. for 2 hours. The pressure increases up to 8 kg./cm.$^2$ (gauge pressure) at 115° C. and thereafter decreases rapidly to 3 kg./cm.$^2$ (gauge pressure). The catalyst is then filtered off and the solvent of the filtrate is evaporated under reduced pressure to obtain 26.5 parts by weight of polyoxyethylene sucrose palmitate. The product is a yellow, transparent and highly viscous liquid at room temperature (20–30° C.) and solidifies upon cooling; it is soluble in water, ethanol, dioxane, etc. The saponification value of the product is 48.5. The surface tension of a 0.1% aqueous solution of the product is 41.5 dyne/cm. The product is a mixture of dipalmitate, monopalmitate and a little amount of some impurities.

EXAMPLE 2

3.4 parts by weight of sucrose and 5.9 parts by weight of methyl oleate are dissolved in 20 parts by volume of dimethyl formamide and to the solution there is added 0.1 part by weight of sodium hydroxide as catalyst. Reaction is effected for 3 hours at 100° C. under the reduced pressure of 80 mm. Hg. The reaction mixture is extracted twice with 20 parts each by volume of n-hexane to remove unreacted methyl oleate. Into the mixture thus-treated, there are dissolved 20 parts by weight of ethylene oxide at 5–10° C., and reaction then effected for 2 hours at 120° C. in an autoclave. The pressure in the autoclave increases up to 17 kg./cm.$^2$ (gauge pressure) and then decreases to 8 kg./cm.$^2$. The reaction mixture is filtered to remove catalyst and the solvent of the filtrate is eliminated under reduced pressure to obtain 15.8 parts by weight of polyoxyethylene sucrose oleate as an orange, highly viscous liquid. The saponification value of the product is 42.0. The product is dioleate containing a little amount of some impurities.

EXAMPLE 3

3.4 parts by weight of sucrose and 2.7 parts by weight of methyl palmitate are dissolved in 12 parts by weight of formylpyrrolidine, after which 0.1 part by weight of potassium hydroxide is added as catalyst. Reaction is effected at 95° C. for 1.5 hours under the reduced pressure of 30 mm. Hg. Upon completion of the reaction, the solvent is recovered by distillation under reduced pressure. Into the so-produced mixture of sucrose and sucrose esters is added a small quantity of water, and the mixture then extracted with 30 parts by weight of benzene to transfer only sucrose esters into benzene layer. The benzene solution is dried over sodium sulfate, and 18 parts by weight of ethylene oxide are then dissolved in the benzene solution. Addition reaction is then effected in an autoclave in the presence of potassium hydroxide as catalyst. Upon completion of the reaction, the catalyst and benzene are eliminated by filtration and by distillation under atmospheric pressure, respectively, to obtain 8.2 parts by weight of polyoxyethylene sucrose dipalmitate as a yellow, highly viscous liquid. Its saponification value is 48.5 which corresponds to 34 ethylene oxide moles per one mole of sucrose diester. The product is soluble in water and in many organic solvents.

EXAMPLE 4

20.5 parts by weight of sucrose and 35.7 parts by weight of methyl stearate are dissolved in 170 parts by weight of formylmorpholine, and to the solution is then added 0.7 part by weight of potassium carbonate. The mixture is heated for 6 hours at 100° C. under the pressure of 30 mm. Hg and then distilled to recover formylmorpholine. The resultant residue is dissolved in hot acetone and the acetone solution is filtered to remove insoluble substances. The filtrate is cooled at a temperature from 5 to 10° C. to obtain a white powder, the saponification value of which is 124.2, the powder consisting mostly of sucrose distearate. The white powder is recrystallized from acetone to give 38.5 parts by weight of pure sucrose distearate, having the saponification value 129.6 and the specific rotation $[\alpha]_D^{22}=+25.3$.

3.0 parts by weight of the above-obtained sucrose distearate are dissolved in 20 parts by weight of benzene and then 18 parts by weight of ethylene oxide are added to the solution at a temperature not in excess of 10° C. The mixture is subjected to reaction in an autoclave in the presence of 0.05 part by weight of sodium hydroxide after the manner described in Example 3 to obtain 14.0 parts by weight of polyoxyethylene sucrose distearate as yellow wax. Its saponification value is 25.5, so that it has about 80 units of oxyethylene groups per mole.

EXAMPLE 5

In a similar manner to Example 4, 34.3 parts by weight of pure sucrose dimyristate are obtained as white powder from 20.5 parts by weight of sucrose and 29.1 parts by weight of methyl myristate. The so-obtained sucrose dimyristate shows the following characteristics.

Saponification value: 144.1
Specific rotation: $[\alpha]_D^{25} = +31.2$
Softening point: 73–75° C.

In an autoclave having 50 parts by volume capacity, 3.0 parts by weight of the sucrose dimyristate are heated together with 10 parts by weight of liquid ethylene oxide and, as catalyst, 0.05 part by weight of methyl morpholine. The transition of the temperature and the pressure in the autoclave are as follows:

| Time (minutes) | 0 | 10 | 20 | 30 | 40 | 42 | 43 | 44 | 45 | 47 | 50 | 55 |
|---|---|---|---|---|---|---|---|---|---|---|---|---|
| Temperature (° C.) | 8 | 40 | 75 | 93 | 103 | 110 | 113 | 116 | 116 | 116 | 113 | 108 |
| Pressure (kg./cm.²) (guage pressure) | 0 | 2.3 | 7.0 | 10.9 | 13.8 | 14.8 | 12.1 | 10.5 | 9.6 | 7.9 | 6.0 | 4.0 |

The reaction proceeds rapidly at about 110° C. at about 40 minutes after the start and substantially ceases after 55 minutes. Upon completion of the reaction, the reaction mixture is dissolved in acetone. The acetone solution is filtered and the filtrate is distilled to remove acetone. The residue is further heated at a temperature not in excess of 120° C. under a pressure of 0.01 mm. Hg to obtain 6.9 parts by weight of polyoxyethylene sucrose dimyristate as a highly viscous yellow liquid. Its saponification value is 55.9, the product having about 30 units of oxyethylene groups per mole.

EXAMPLE 6

20.5 parts by weight of sucrose and 31.6 parts by weight of methyl erucate are dissolved in 150 parts by weight of dimethylformamide. The solution is heated for 4 hours at 100 C. under a pressure of 120 mm. Hg in the presence of 0.6 part by weight of potassium carbonate. Upon completion of the reaction, the solvent is evaporated and the residue is extracted with acetone. The actone extract is distilled to remove the solvent and to leave a mixture of sucrose mono- and di-erucates, the saponification value of which is 103.5.

5.0 parts by weight of the so-obtained mixture of sucrose erucates are dissolved in 20 parts by weight of xylene, and to the solution 25 parts by weight of ethylene oxide are added at 10–15° C. The mixture is subjected to reaction as in Example 4 in an autoclave in the presence of 0.1 part by weight of sodium methylate. Xylene is recovered by distillation from the reaction mixture, and 20.5 parts by weight of a mixture of polyoxyethylene mono- and dierucates are obtained as an orange oil having a saponification value 28.8.

EXAMPLE 7

20.5 parts by weight of sucrose and 9.2 parts by weight of methyl stearate are dissolved in 100 parts by weight of N-methylpyrrolidine, and to the solution is added 0.3 part by weight of potassium carbonate. The mixture is heated for 5 hours at 100° C. under a pressure of 50 mm. Hg. N-methylpyrrolidone is removed by distillation in vacuo and the residue is extracted with hot ethanol to give a white solid substance, which is recrystallized twice from ethanol to yield 7.1 parts by weight of pure sucrose monostearte, which has the following characteristics:

Saponification value: 93.7
Specific rotation: $[\alpha]_D^{25} = +37°$
Softening point: 54–55° C.

An autoclave is charged with 5.0 parts by weight of the above-obtained sucrose monostearate, after which 12 parts by weight of liquid ethylene oxide are added and, as catalyst, 0.1 part by weight of dimethylbenzylamine. The reaction is effected in a similar manner to that described in Example 5 to give 10.8 parts by weight of polyoxyethylene sucrose monostearate as a yellow wax having the saponification value 43.3, the product having about 15 units of oxyethylene groups per mole.

EXAMPLE 8

20.5 parts by weight of sucrose and 35.0 parts by weight of mixed methyl esters of beef tallow fatty acids are dissolved in 150 parts by weight of formylpyrrolidine, and to the solution 0.7 part by weight of potassium carbonate is then added. The mixture is treated in a similar manner to that described in Example 4 to obtain 47 parts by weight of white powder consisting mostly of sucrose diesters formed with beef tallow fatty acids.

5 parts by weight of the above-obtained mixed sucrose diesters and 15 parts by weight of ethylene oxide are dissolved in 15 parts by weight of acetylmorpholine. The solution is subjected to the addition reaction in the presence of 0.05 part by weight of sodium hydroxide as the catalyst under similar conditions to those described in Example 1. The pressure rises to the maximum, i.e. 19.5 kg./cm.² (gauge pressure) at about 152° C., and then decreases to 8.5 kg./cm.² (gauge pressure) in several minutes with generation of heat. The product is 16.2 parts by weight of a mixture of polyoxyethylene sucrose diesters formed with beef tallow fatty acids, the saponification value of which is 40.5.

EXAMPLE 9

3.4 parts by weight of sucrose and 6.0 parts by weight of mixed methyl esters of soybean oil fatty acid are dissolved in 30 parts by volume of formyl pyrrolidine, and 0.1 part by weight of sodium methylate is added as catalyst to the solution. The mixture is heated to 100° C. under a pressure of 50 mm. Hg for 5 hours to effect the transesterification reaction. Ethylene oxide is dissolved in the mixture at 10–15° C. until the weight of the reaction mixture increases by 12 parts by weight. The resulting mixture is poured into an autoclave of 200 parts by volume capacity, after which 0.1 part by weight of potassium hydroxide is added. The addition reaction begins at about 132° C. under a pressure of about 23 kg./cm.² (gauge pressure) and continues for several minutes. The product is 18.3 parts by weight of a mixture of polyoxyethylene sucrose diesters formed with soybean oil fatty acids, and is an orange oil, the saponification value of which is 57.3.

EXAMPLE 10

3.4 parts by weight of sucrose and 3.1 parts by weight of methyl ricinoleate are dissolved in 50 parts by weight of dimethylformamide, after which 0.1 part by weight of potassium carbonate is added to the solution. The mixture is heated to 95° C. under a pressure of 100 mm. Hg to effect the transesterification reaction. Upon completion of the reaction, the solvent is removed by distillation in vacuo to produce 5.8 parts by weight of a mixture of sucrose mono- and diricinoleates.

The product is transferred into an autoclave, after which 11 parts by weight of ethylene oxide and 0.1 part by weight of sodium methylate are added to effect the addition reaction. In this reaction, transitions of the reaction temperature and the pressure are shown as follows:

| Time (minutes) | 0 | 10 | 20 | 30 | 40 | 50 | 55 | 60 | 65 | 70 | 90 |
|---|---|---|---|---|---|---|---|---|---|---|---|
| Temperature (° C.) | 12 | 40 | 74 | 106 | 136 | 157 | 162 | 161 | 158 | 155 | 142 |
| Pressure (kg./cm.²) | 0 | 2.2 | 4.6 | 6.5 | 8.3 | 10.4 | 9.0 | 7.6 | 6.2 | 4.8 | 3.3 |